United States Patent
Imai et al.

(10) Patent No.: US 8,310,640 B2
(45) Date of Patent: Nov. 13, 2012

(54) LIQUID CRYSTAL DISPLAY DEVICE HAVING PIXEL ELECTRODE WITH PLURALITY OF UNIT ELECTRODE PORTIONS INCLUDING SLITS

(75) Inventors: Hajime Imai, Osaka (JP); Tetsuo Kikuchi, Osaka (JP); Hideki Kitagawa, Osaka (JP); Yoshihito Hara, Osaka (JP); Junya Shimada, Osaka (JP); Mitsunori Imade, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 560 days.

(21) Appl. No.: 12/523,765

(22) PCT Filed: Jan. 22, 2008

(86) PCT No.: PCT/JP2008/050746
§ 371 (c)(1),
(2), (4) Date: Jul. 20, 2009

(87) PCT Pub. No.: WO2008/090856
PCT Pub. Date: Jul. 31, 2008

(65) Prior Publication Data
US 2010/0045917 A1  Feb. 25, 2010

(30) Foreign Application Priority Data
Jan. 26, 2007  (JP) ................................ 2007-016873

(51) Int. Cl.
*G02F 1/1333* (2006.01)
*G02F 1/1343* (2006.01)
(52) U.S. Cl. .......... 349/139; 349/90; 349/141; 349/144
(58) Field of Classification Search .................. 349/139, 349/90, 143, 144
See application file for complete search history.

(56) References Cited

U.S. PATENT DOCUMENTS

| | | | |
|---|---|---|---|
| 6,922,183 B2 * | 7/2005 | Ting et al. | 345/87 |
| 7,023,516 B2 | 4/2006 | Yoshida et al. | |
| 7,728,944 B2 * | 6/2010 | Hu et al. | 349/144 |
| 7,978,298 B2 * | 7/2011 | Saitoh et al. | 349/156 |
| 2002/0075436 A1 | 6/2002 | Kubo et al. | |
| 2002/0080312 A1 | 6/2002 | Yamaguchi et al. | |
| 2004/0233360 A1 | 11/2004 | Yoshida et al. | |

(Continued)

FOREIGN PATENT DOCUMENTS

CN  1544985 A  11/2004
(Continued)

OTHER PUBLICATIONS

Supplementary European Search Report mailed Jul. 5, 2010 in EP application 08703596.0.
(Continued)

*Primary Examiner* — Huyen Ngo
(74) *Attorney, Agent, or Firm* — Nixon & Vanderhye P.C.

(57) ABSTRACT

A liquid crystal display device according to the present invention includes a vertical alignment type liquid crystal layer 32. Each pixel electrode thereof 12 has a plurality of unit electrode portions 12a, each of which has a conductive film and slits 13 that have been cut through the conductive film. When a predetermined voltage is applied between the pixel electrode and a counter electrode, a liquid crystal domain is produced in association with each unit electrode portion and liquid crystal molecules in the liquid crystal domain come to have a substantially radially tilting alignment state. As a result, the device of the present invention achieves a wide viewing angle and a fast response characteristic.

4 Claims, 6 Drawing Sheets

U.S. PATENT DOCUMENTS

| | | | |
|---|---|---|---|
| 2005/0083479 A1* | 4/2005 | Okumura | 349/178 |
| 2005/0168672 A1 | 8/2005 | Tashiro et al. | |
| 2006/0033853 A1 | 2/2006 | Lee et al. | |
| 2008/0266480 A1* | 10/2008 | Lee | 349/48 |
| 2009/0161049 A1* | 6/2009 | Onishi et al. | 349/114 |
| 2009/0295694 A1* | 12/2009 | Chung et al. | 345/90 |

FOREIGN PATENT DOCUMENTS

| | | |
|---|---|---|
| JP | 2006-091229 | 4/2006 |
| JP | 2006-293410 | 10/2006 |

OTHER PUBLICATIONS

English translation of the International Preliminary Report on Patentability mailed Aug. 6, 2009 in corresponding PCT Application No. PCT/JP2008/050746.

International Search Report for PCT/JP2008/050746, mailed Mar. 4, 2008.

Kubo et al., "Development of High-Performance ASV-LCDs Using Continuous Pinwheel Alignment (CPA) Mode", pp. 1-5, Jun. 7, 2001.

* cited by examiner (a)

(b)

LIQUID CRYSTAL DISPLAY DEVICE HAVING PIXEL ELECTRODE WITH PLURALITY OF UNIT ELECTRODE PORTIONS INCLUDING SLITS

This application is the U.S. national phase of International Application No. PCT/JP2008/050746, filed 22 Jan. 2008, which designated the U.S. and claims priority to Japanese Patent Application No. 2007-016873, filed 26 Jan. 2007, the entire contents of each of which are hereby incorporated by reference.

TECHNICAL FIELD

The present invention generally relates to a liquid crystal display device and more particularly relates to a liquid crystal display device with a wide viewing angle characteristic that is good enough to conduct a display operation with high quality.

BACKGROUND ART

Recently, liquid crystal display devices with wide viewing angle characteristics have been developed one after another and used extensively as monitors for personal computers, personal digital assistants, and TV receivers.

One of those liquid crystal display devices with wide viewing angle characteristics uses a vertical alignment type liquid crystal layer, and is said to operate in "VA mode". The applicant of the present application discloses, in Patent Document No. 1, a VA mode liquid crystal display device that would improve the viewing angle characteristic by producing domains with radially tilting alignment in response to a voltage applied. In that liquid crystal display device, when a voltage is applied, domains with multiple radially tilting alignments are produced within each pixel and the alignments of liquid crystal molecules in adjacent domains with such radially tilting alignments are continuous with each other. The applicant of the present application calls the liquid crystal display mode that uses the unique alignment state disclosed in Patent Document No. 1 "continuous pinwheel alignment (CPA) mode" (see Non-Patent Document No. 1). The entire disclosures of Patent Document No. 1 and Non-Patent Document No. 1 are hereby incorporated by reference.

Patent Document No. 1 discloses a configuration of which the pixel electrode has a non-solid portion (i.e., an opening where there is no conductive layer) and in which the radially tilting alignment is produced by using an oblique electric field to be generated at an edge of the non-solid portion of the pixel electrode when a voltage is applied. The patent document also discloses a configuration in which an alignment control structure is provided on one side of the counter substrate, which faces the pixel electrode through a liquid crystal layer, to face the liquid crystal layer to further stabilize the radially tilting alignment (see FIG. 27 of Patent Document No. 1, for example). A raised portion that protrudes into the liquid crystal layer (see FIG. 24(b) of Patent Document No. 1, for example) is disclosed as such an alignment control structure.

Patent Document No. 1: Japanese Patent Application Laid-Open Publication No. 2002-202511

Non-Patent Document No. 1: Kubo et al., Sharp Giho (technical bulletin) Vol. 80, pp. 11-14 (August, 2001)

DISCLOSURE OF INVENTION

Problems to be Solved by the Invention

However, even if such a raised portion (protrusion) were provided on the counter electrode to face the liquid crystal layer as disclosed in FIG. 24(b) of Patent Document No. 1, sufficiently fast response characteristic could still not be achieved in some cases. For example, if a unit electrode portion (i.e., corresponding to the unit solid portion in Patent Document No. 1) associated with each radially tilting alignment domain had an increased size, then its anchoring force would not be applied to the liquid crystal molecules in the liquid crystal domain sufficiently and the response speed would decrease, which is a problem. In that case, a residual image might be perceived.

It is therefore an object of the present invention to provide a liquid crystal display device of a vertical alignment mode that would achieve a wide viewing angle and a fast response characteristic.

Means for Solving the Problems

A liquid crystal display device according to the present invention includes a first substrate, a second substrate and a vertical alignment type liquid crystal layer that is interposed between the first and second substrates. The device further includes pixel electrodes that are arranged on the first substrate to face the liquid crystal layer and a counter electrode that is arranged on the second substrate to face the liquid crystal layer. Each of the pixel electrodes has a plurality of unit electrode portions, each of which has a conductive film and slits that have been cut through the conductive film. When a predetermined voltage is applied between the pixel electrode and the counter electrode, a liquid crystal domain is produced in association with each said unit electrode portion and liquid crystal molecules in the liquid crystal domain come to have a substantially radially tilting alignment state.

In one preferred embodiment, protrusions of a dielectric material are arranged on one side of the counter electrode to face the liquid crystal layer such that the protrusions face substantially the respective centers of their associated unit electrode portions.

In this particular preferred embodiment, the slits are arranged radially around each said protrusion.

In a specific preferred embodiment, each said slit runs longer radially rather than circumferentially if a circle is drawn with the protrusion for its center.

In another preferred embodiment, the number of the slits is at least four.

In still another preferred embodiment, when viewed perpendicularly to the liquid crystal layer, the shortest distance from the center of each said protrusion to an edge of its associated unit electrode portion is more than 20 μm.

Effects of the Invention

In the liquid crystal display device of the present invention, the slits of each unit electrode portion produce anchoring force, thus realizing a fast response characteristic.

Figure 1:
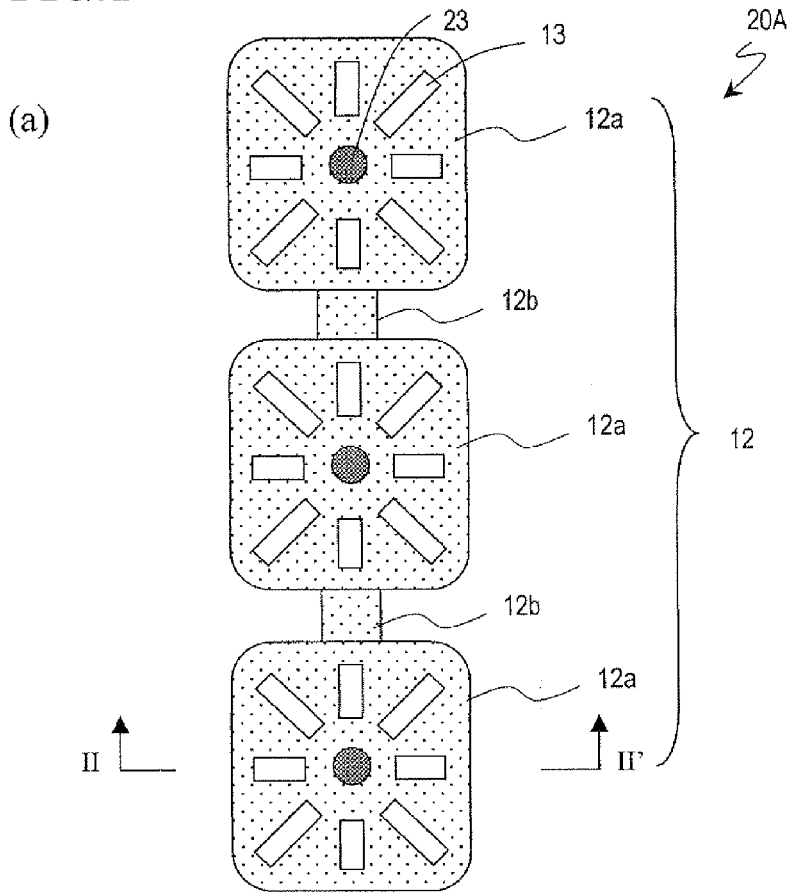
FIG. 1(a) is a plan view schematically illustrating the structure of a region 20A corresponding to a single pixel of a liquid crystal display device 20 as a preferred embodiment of the present invention.
FIG. 1(b) is a plan view schematically illustrating the structure of a region 20B corresponding to a single pixel of another liquid crystal display device 20 as another preferred embodiment of the present invention.
Figure 1:
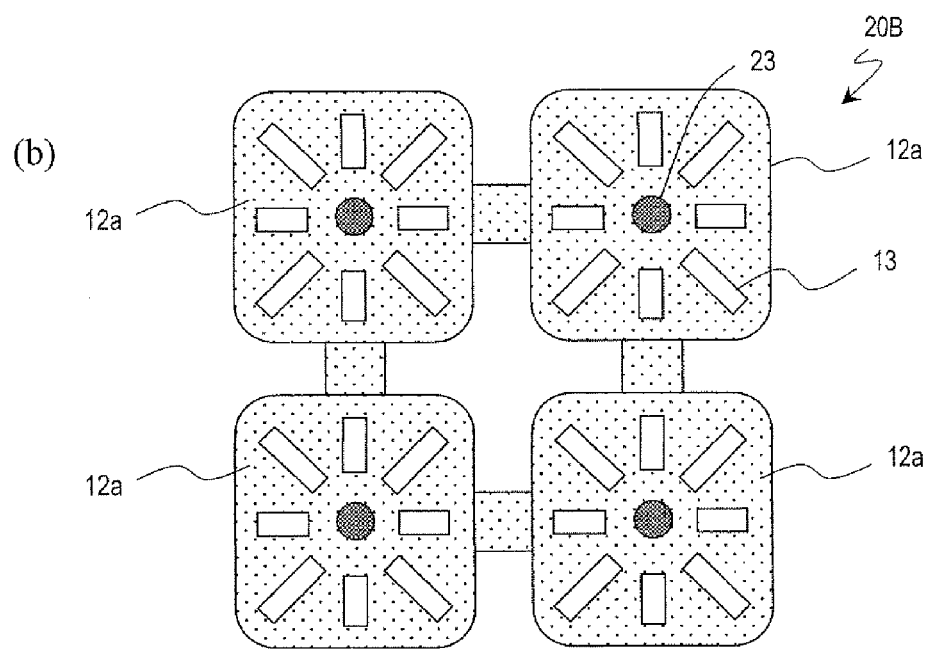

DESCRIPTION OF REFERENCE NUMERALS 11 first substrate (glass substrate with TFTs)
12 pixel electrode
12a unit electrode portion
12b connecting portion
13 slit
20 liquid crystal display device
20A, 20B region corresponding to a pixel
21 second substrate (glass substrate with color filters)
22 counter electrode
23 protrusion (raised portion or rivet)
32 vertical alignment type liquid crystal layer
32a liquid crystal molecules

BEST MODE FOR CARRYING OUT THE INVENTION

Hereinafter, preferred embodiments of the present invention will be described with reference to the accompanying drawings. However, the present invention is in no way limited to those specific preferred embodiments to be described below.

First of all, problems with the conventional CPA mode liquid crystal display device that are pointed out by the present inventors will be described with reference to FIGS. 5 to 7.

Figure 5:
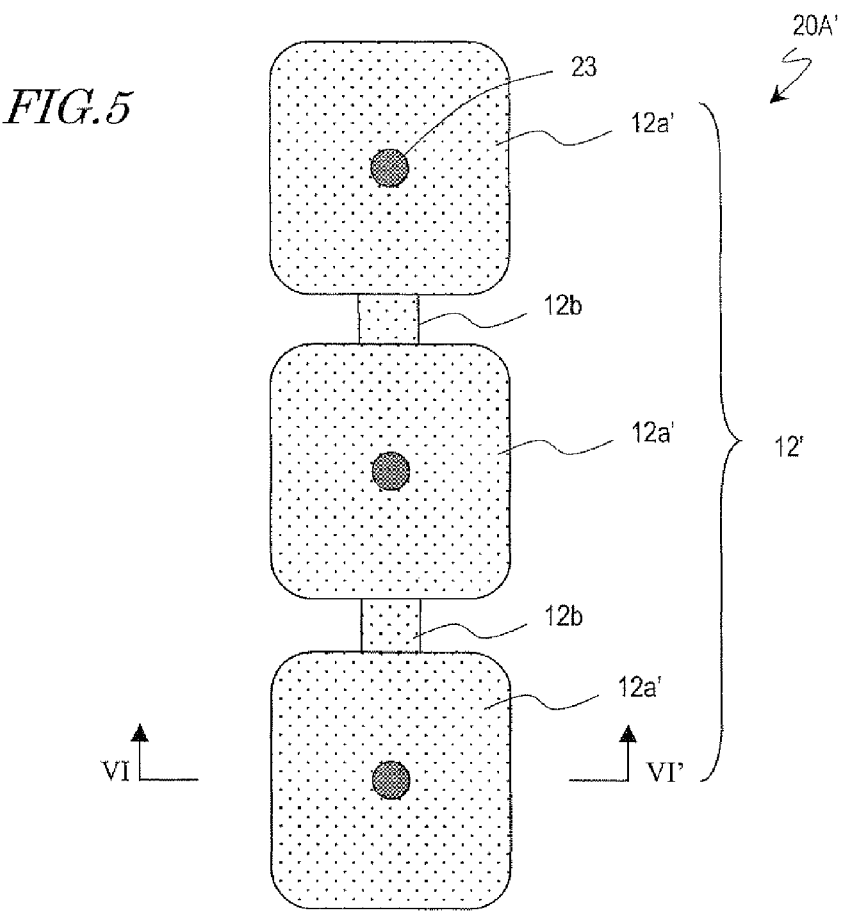
FIG. 5 is a plan view schematically illustrating the structure of a region 20A' corresponding to a single pixel of a conventional CPA mode liquid crystal display device 20' disclosed in Patent Document No. 1.
Figure 6:
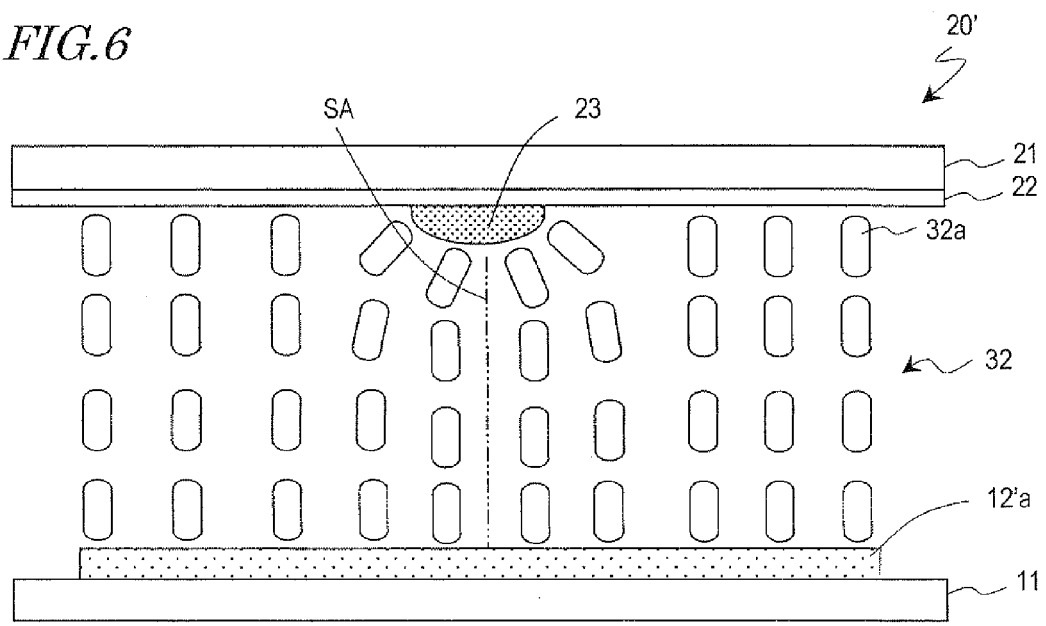
FIG. 6 is a schematic cross-sectional view as viewed on the plane VI-VI' shown in FIG. 5.

Now take a look at FIGS. 5 and 6. FIG. 5 is a plan view schematically illustrating the structure of a region 20A' corresponding to a single pixel of the conventional CPA mode liquid crystal display device 20' disclosed in Patent Document No. 1, while FIG. 6 is a schematic cross-sectional view as viewed on the plane VI-VI' shown in FIG. 5. FIG. 6 illustrates the orientations of liquid crystal molecules when no voltage is applied to the liquid crystal layer (i.e., a voltage lower than a threshold voltage is applied thereto).

In the drawings, the wiring structure (including TFTs, source bus lines, and gate bus lines) for supplying a predetermined voltage (as a display signal voltage) to the pixel electrodes, storage capacitors (CS) that hold the voltage to be applied to the liquid crystal layer, and other members are not illustrated for the sake of simplicity of description. The liquid crystal display device of the present invention is typically implemented as a TFT LCD but could also use any other type of active elements such as MIMs.

As used herein, the "vertical alignment type liquid crystal layer" means a liquid crystal layer in which the axis of liquid crystal molecules (which will be sometimes referred to herein as an "axis direction") defines a tilt angle of approximately 85 degrees or more with respect to the surface of a vertical alignment film. Liquid crystal molecules have negative dielectric anisotropy and are combined with polarizers that are arranged as crossed Nicols to get a display operation done in normally black mode. The alignment film may be provided for at least one of the two substrates. However, to stabilize the alignment, each of the two substrates is preferably provided with an alignment film. In the preferred embodiment to be described below, each of the two substrates is provided with a vertical alignment film. As used herein, a "pixel" refers to a minimum unit for representing a particular gray scale tone on the screen, and corresponds to a unit for representing each gray scale tone of R, G and B in color display and is also called a "dot". A combination of R, G and B pixels forms a single color display pixel. A "pixel region" refers to a region of a liquid crystal display device that is allocated to a single "pixel" on the screen.

As shown in FIGS. 5 and 6, the conventional liquid crystal display device 20' includes a first substrate (e.g., a TFT substrate) 11, a second substrate (e.g., a color filter substrate) 21 and a vertical alignment type liquid crystal layer 32 that is interposed between the first and second substrates 11 and 21. In a CPA mode liquid crystal display device, two polarizers are actually arranged as crossed Nicols so as to sandwich the first and second substrates 11 and 21 between them and, if necessary, a quarter wave plate is further arranged between each substrate and its polarizer. But these members are not illustrated in FIG. 6. If the quarter wave plates are provided, then the device can have its optical efficiency increased.

The conventional liquid crystal display device 20' includes pixel electrodes 12' that are arranged on the first substrate 11 to face the liquid crystal layer 32 and a counter electrode 22 that is arranged on the second substrate 21 to face the liquid crystal layer 32. The counter electrode 22 is typically provided as a single transparent conductive film so as to face every pixel electrode 12'. In the CPA mode liquid crystal display device, each pixel electrode 12' has a plurality of unit electrode portions 12'a. And when a predetermined voltage (that is equal to or higher than the threshold voltage of the liquid crystal layer and that is applied to display a certain grayscale tone) is applied between the pixel electrode 12' and the counter electrode 22, a liquid crystal domain is produced in association with each unit electrode portion 12'a and liquid crystal molecules 32a in the liquid crystal domain come to have radially tilting alignment state (which will be simply referred to herein as "radially tilting alignment"). Those unit electrode portions 12'a are connected together with connecting portions 12b and have the same potential. A single radially tilting alignment domain is produced in association with each unit electrode portion 12'a due to the anchoring force produced by an oblique electric field around an edge of the unit electrode portion 12'a that has an isolated island-like outer periphery. In the pixel electrode 12' shown in FIG. 5 three islands of substantially square unit electrode portions 12'a with four rounded corners are connected together with two connecting portions 12b. That is why the electric field generated at an edge of the unit electrode portion 12'a, not where the unit electrode portions 12'a are connected together with the connecting portion 12b, will tilt toward the center of the unit electrode portion 12'a and will cause the liquid crystal molecules 32a to have a radially tilting alignment. In this example, the unit electrode portion 12'a and the connecting portion 12b are made of the same conductive film (of ITO, for example). However, since the unit electrode portions 12'a just need to have the same potential, those unit electrode portions 12'a could be totally isolated from each other as three islands, a contact hole may be cut through the interlayer dielectric film in the lower part of each unit electrode portion 12'a, and the unit electrode portion 12'a could be electrically connected to the drain electrode of its associated TFT inside each contact hole. In that case, the oblique electric field generated around the entire edge of each unit electrode portion 12'a will cause the liquid crystal molecules 32a to have the radially tilting alignment, thus stabilizing their alignment state.

The pixel electrode structure of the CPA mode device is characterized in that there is a region where the conductive film discontinues (i.e., where there is no connecting portion 12b in this example and such a region is called a "non-solid portion" in Patent Document No. 1) between the radially tilting alignment domains produced in the respective unit electrode portions 12'a. Even in such a region where the conductive film discontinues, the liquid crystal molecules 32a are also aligned continuously with their counterparts 32a in the adjacent radially tilting alignment domains, and therefore, would contribute to stabilizing the alignment state of the radially tilting alignment domains produced in the respective unit electrode portions 12'a.

There is a protrusion 23 of a dielectric material (which is called a "raised portion" or a "rivet") on the surface of the counter electrode 22 to face the liquid crystal layer 32 so as to face approximately the center of its associated unit electrode portion 12'a. As shown in FIG. 6, the liquid crystal molecules 32a are aligned perpendicularly to the surface of this protrusion 23 (more exactly, to the surface of a vertical alignment film (not shown) that covers the protrusion 23). As a result, the liquid crystal molecules 32a are aligned radially around the peak of the protrusion 23 and the axis of symmetry SA of this radially tilting alignment can be defined around the peak of the protrusion 23. In this manner, the protrusion 23 functions so as to fix the position of the axis of symmetry SA. Also, since anchoring force is always produced due to the surface shape of the protrusion 23, no matter whether there is an electric field or not, the protrusion 23 can also stabilize the radially tilting alignment when either no electric field or just a weak electric field is applied.

Next, it will be described with reference to FIGS. 7(a) through 7(d) what if the conventional CPA mode liquid crystal display device 20' does not have sufficiently fast response characteristic. Each of FIGS. 7(a) through 7(d) schematically illustrates how the alignment state of the liquid crystal molecules 32a will change when a certain amount of time has passed after a voltage to produce a white display state (i.e., a voltage to display the highest grayscale) was applied to the liquid crystal layer 32 to which no voltage had been applied (see FIG. 6) in the liquid crystal display device 20'. Specifically, FIGS. 7(a), 7(b), 7(c) and 7(d) illustrate the alignment states of the liquid crystal molecules 32a in 5 ms, 10 ms, 15 ms and 20 ms, respectively, after the application of that white voltage. The liquid crystal layer 32 has a thickness of 3.5 µm, the nematic liquid crystal material has a dielectric anisotropy $\Delta \in$ of −2.8 (at 20° C.) and the white voltage is 7 V.

As shown in FIG. 7(a), by applying the white voltage, an electric field is generated in the liquid crystal layer 32. In that case, the equipotential lines EQ of that electric field generated will fall (i.e., incline) at the edge (where the conductive film discontinues) of the unit electrode portion 12'a but will run substantially parallel to each other between the unit electrode portion 12'a and the counter electrode 22. The dielectric constant of the dielectric material of the protrusion 23 is preferably smaller than the average dielectric constant of the liquid crystal layer 32. In that case, the equipotential lines EQ will curve in the vicinity of the protrusion 23 and the anchoring force produced by the surface shape of the protrusion 23 and the anchoring force produced by the electric field will join together to align the liquid crystal molecules 32a in a predetermined direction.

As strong anchoring force is applied on the liquid crystal molecules 32a at the protrusion 23 and at the edge of the unit electrode portion 12a, the liquid crystal molecules 32a near the protrusion 23 and the edge of the unit electrode portion 12a start to change their orientations parallel to the equipotential lines EQ earlier than the other liquid crystal molecules 32a. As shown in FIGS. 7(b) and 7(c), the liquid crystal molecules 32a between the protrusion 23 and the unit electrode portion 12'a also change their orientations gradually with time. And eventually, those liquid crystal molecules 32a come to have the alignment state defined by the voltage applied to the liquid crystal layer 32 (i.e., a steady state) as shown in FIG. 7(d).

For that reason, the longer the distance from the protrusion 23 to the edge of the unit electrode portion 12'a, the longer the time it would take for the liquid crystal molecules 32a between them to change their orientations fully and reach the steady state. In that case, the liquid crystal molecules 32a could not reach the steady state within one frame (i.e., one vertical scanning period of 16.6 ms, for example), thus possibly having the viewer perceive a residual image.

The present inventors actually made various liquid crystal display devices with the pixel structure shown in FIG. 5 (of which the liquid crystal layer 32 had a thickness of approximately 4 µm) to see if those devices produced the residual image. As a result, when the substantially square unit electrode portion shown in FIG. 5 had a length of approximately 45 µm or more each side, the residual image was sometimes perceived. This corresponds to a situation where when viewed perpendicularly to the liquid crystal layer 32 (i.e., along a normal to the display screen), the shortest distance from the center of the protrusion 23 to the edge of the unit electrode portion 12'a is more than approximately 20 µm and the longest distance between them is more than approximately 30 µm. As disclosed in Patent Document No. 1, the unit electrode portion 12'a could have any of various shapes considering the effective aperture ratio of the pixel or the stability of alignment. However, if the shortest distance exceeded approximately 20 µm or if the longest distance exceeded approximately 30 µm, the response characteristic could be a problem.

Hereinafter, a configuration for a liquid crystal display device as a preferred embodiment of the present invention will be described with reference to FIGS. 1 to 3. The liquid crystal display device of this preferred embodiment is also a CPA mode LCD and has the same features as the conventional CPA mode LCD described above. Thus, each of their common components is identified by the same reference numeral and the description thereof will be omitted herein to avoid redundancies.

Figure 2:
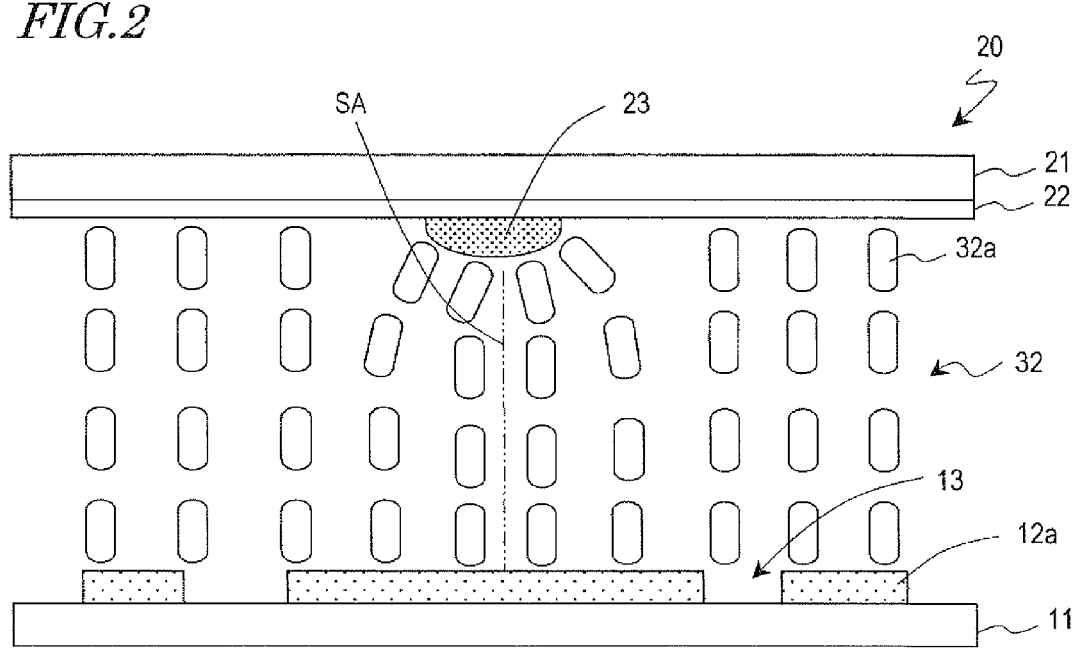
FIG. 2 is a schematic cross-sectional view as viewed on the plane II-II' shown in FIG. 1(a).

Now look at FIGS. 1 and 2 first. FIG. 1(a) is a plan view schematically illustrating the structure of a region 20A corresponding to a single pixel of a liquid crystal display device 20 as a preferred embodiment of the present invention. FIG. 1(b) is a plan view schematically illustrating the structure of a region 20B corresponding to a single pixel of another liquid crystal display device 20 as another preferred embodiment of the present invention. And FIG. 2 is a schematic cross-sectional view as viewed on the plane II-II' shown in FIG. 1(a). The alignment state of the liquid crystal molecules 32a shown in FIG. 2 is their state when no voltage is applied yet to the liquid crystal layer 32 (i.e., a voltage that is lower than a threshold voltage is applied thereto).

As shown in FIG. 1(*a*) or 1(*b*), the pixel electrode 12 of the liquid crystal display device 20 as a preferred embodiment of the present invention is different from that of the conventional CPA mode liquid crystal display device described above in that each of the multiple unit electrode portions 12*a* has a conductive film 12*a* and slits 13 that have been cut through the conductive film 12*a*. In this case, the conductive film and the unit electrode portion are identified by the same reference numeral of 12*a*.

A protrusion 23 of a dielectric material is arranged on the surface of the counter electrode 22 to face the liquid crystal layer 32 so as to face approximately the center of each unit electrode portion 12*a*. And those slits 13 are arranged radially around the protrusion 23. Each of the slits 13 preferably runs longer radially than circumferentially when a circle is drawn with the protrusion 23 for its center.

As shown in FIG. 1, the number of the slits 13 is preferably four or more and those slits are preferably arranged so as to equally divide the central angle of a circle drawn round the protrusion. For example, four slits may be arranged every 90 degrees or eight slits may be arranged every 45 degrees. That is to say, the slits 13 are preferably arranged so as to have a rotational symmetry that would have an n-fold rotation axis (where n is an integer that is equal to or greater than two and more preferably four or more) at the center of the protrusion 23. By arranging the slits 13 in this manner, the liquid crystal domains to be produced in association with the respective unit electrode portions 12*a* can have their alignment state stabilized more effectively. It should be noted that not all of these slits 13 have to have the same length but the lengths of the slits 13 could be determined appropriately according to the shape of the unit electrode portions 12*a*. For example, as shown in FIG. 1, the slits 13 running diagonally through the unit electrode portion 12*a* may be longer than the slits 13 running perpendicularly to its sides.

Although the slits 13 shown in FIG. 1 are rectangular, the present invention is in no way limited to these specific examples. Alternatively, square, circular, elliptical, diamond, trapezoid, cuplike, teardrop, or spiral slits (or openings) could be arranged as well.

Next, it will be described with reference to FIGS. 3(*a*) to 3(*c*) how the liquid crystal display device 20 of this preferred embodiment of the present invention can have response characteristic superior to that of the conventional device 20'. Each of FIGS. 3(*a*) through 3(*c*) schematically illustrates how the alignment state of the liquid crystal molecules 32*a* will change when a certain amount of time has passed after a voltage to produce a white display state was applied to the liquid crystal layer 32 to which no voltage had been applied (see FIG. 2). FIGS. 3(*a*) through 3(*c*) illustrate the alignment states of the liquid crystal molecules 32*a* in the same amounts of time after the application of the white voltage as in FIG. 7(*a*) through 7(*c*). The conditions are quite the same as in FIG. 7 except that the electrode structure is different. The alignment state of the liquid crystal molecules 32*a* to which no voltage is applied yet as shown in FIG. 2 is the same as the one shown in FIG. 6.

Figure 3:
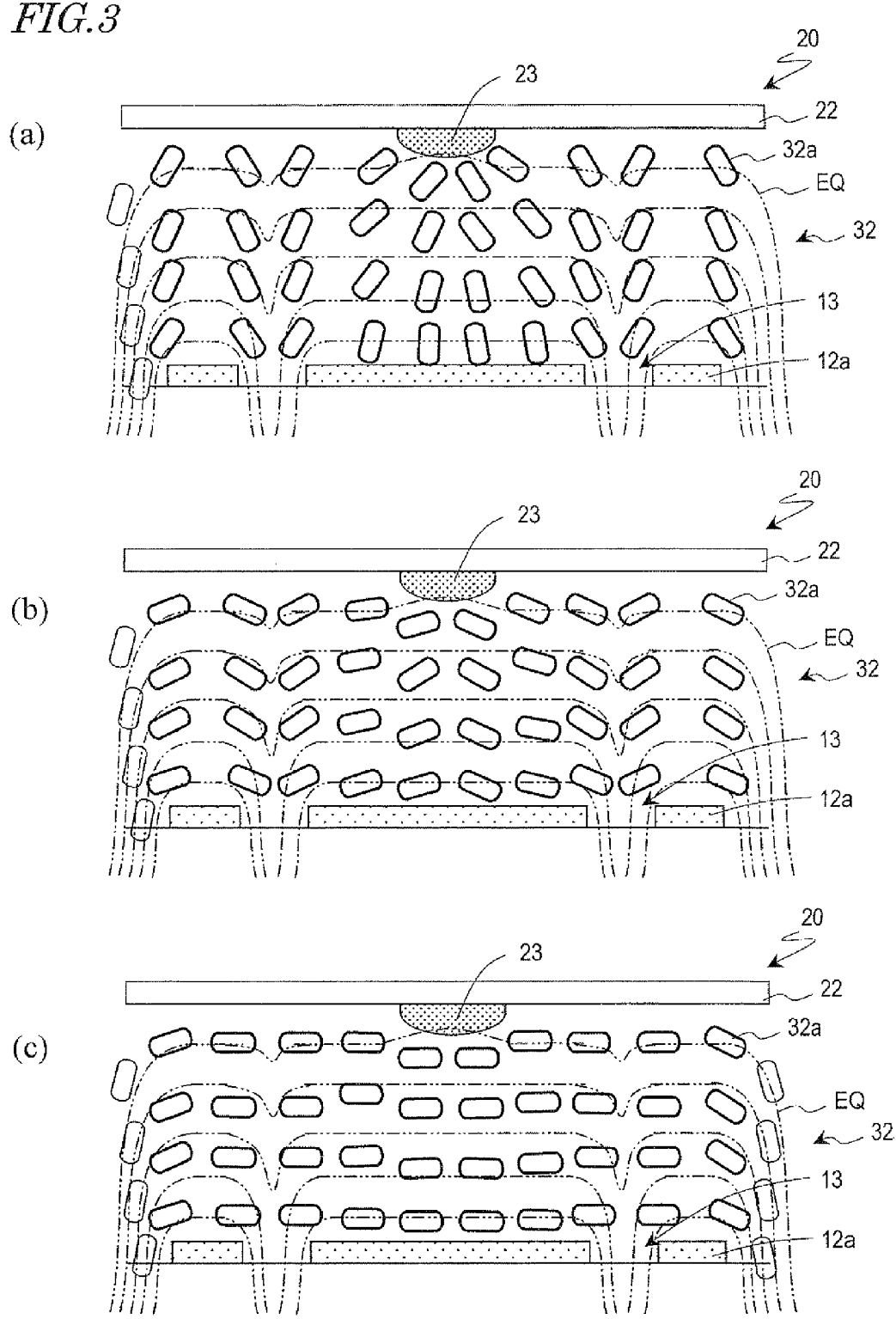
FIGS. 3(a) through 3(c) schematically illustrate how liquid crystal molecules 32a change their alignment states in certain amounts of time after the application of a white voltage to the liquid crystal layer of the liquid crystal display device 20.

As shown in FIG. 3(*a*), by applying the white voltage, an electric field is generated in the liquid crystal layer 32. In that case, the equipotential lines EQ of that electric field generated will fall (i.e., incline) at the edge of the unit electrode portion 12*a* (where the conductive film discontinues) but will run substantially parallel to each other between the unit electrode portion 12*a* and the counter electrode 22. If the dielectric constant of the dielectric material of the protrusion 23 is smaller than the average dielectric constant of the liquid crystal layer 32, then the equipotential lines EQ will curve in the vicinity of the protrusion 23 as shown in FIG. 3 and the anchoring force produced by the surface shape of the protrusion 23 and the anchoring force produced by the electric field will join together to align the liquid crystal molecules 32 in a predetermined direction. Furthermore, since the unit electrode portion 12*a* has slits 13, an oblique electric field is also generated at the edge of the slits 13 and will cause the liquid crystal molecules 32*a* to tilt. In that case, the distance from the protrusion 23 to the edge of the slits 13 (i.e., the edge that is located closest to the protrusion 23) is naturally shorter than the distance from the protrusion 23 to the edge of the unit electrode portion 12*a*. That is why the liquid crystal molecules 32*a* located between the protrusion 23 and the slits 13 will be controlled by the anchoring force being produced by the oblique electric field more strictly than the liquid crystal molecules 32*a* located between the protrusion 23 and the edge of the unit electrode portion 12'*a* in the conventional liquid crystal display device 20'.

Figure 7:
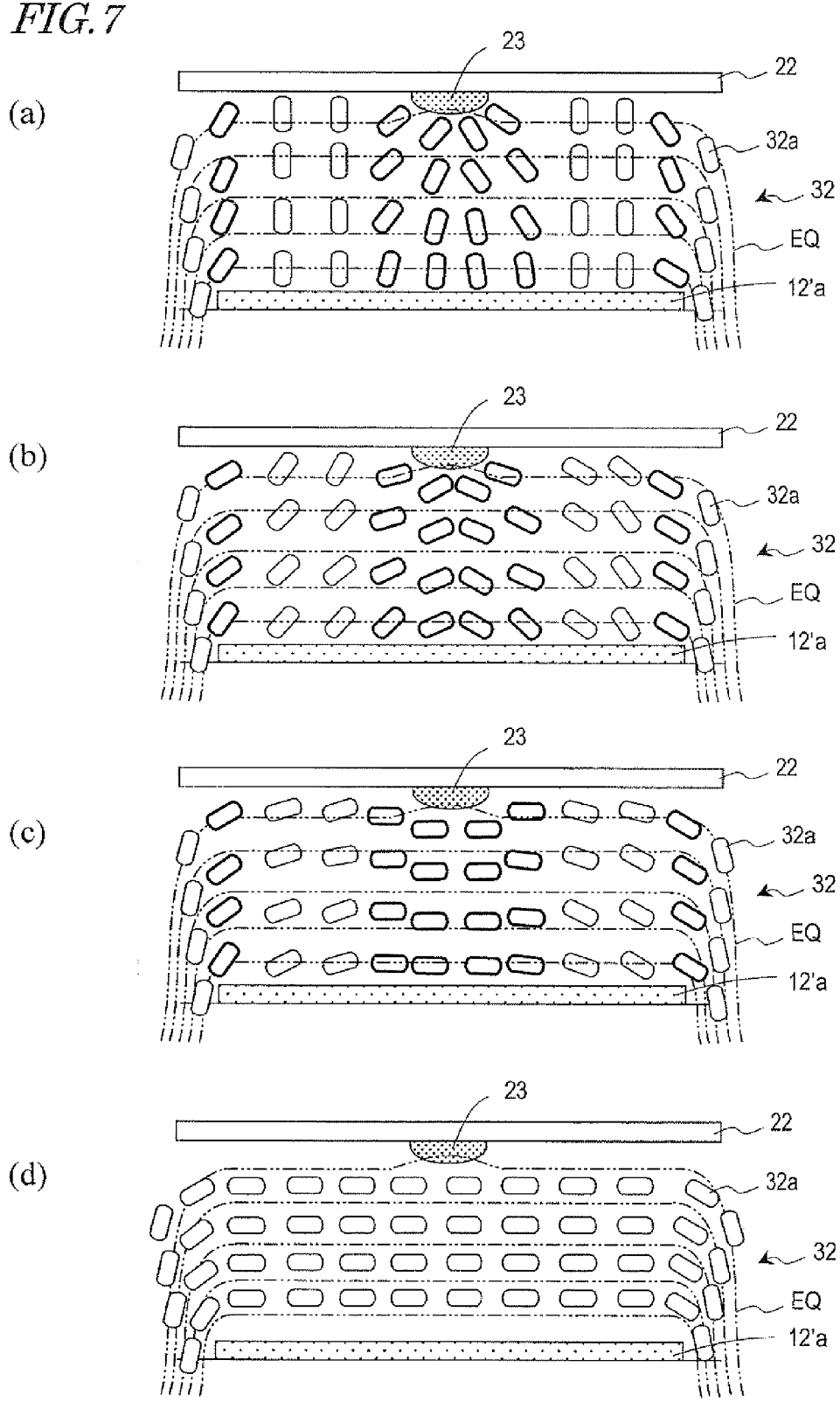
FIGS. 7(a) through 7(d) schematically illustrate how the alignment state of liquid crystal molecules 32a will change when a certain amount of time has passed after a voltage to produce a white display state was applied to the liquid crystal layer 32 to which no voltage had been applied in the liquid crystal display device 20'.

Thus, comparing FIG. 3(*a*) to FIG. 7(*a*), it can be seen easily that by the point in time shown in FIG. 3(*a*), the liquid crystal molecules 32*a* in the liquid crystal layer 32 of the liquid crystal display device 20 of this preferred embodiment have already tilted toward predetermined directions as being controlled by the anchoring force produced by the oblique electric field. As a result, at the point in time shown in FIG. 3(*b*), the liquid crystal molecules 32*a* are more tilted than in FIG. 7(*b*). Furthermore, although the conventional liquid crystal layer 32 has not reached the steady state yet even at the point in time shown in FIG. 7(*c*), the liquid crystal layer 32 of the liquid crystal display device 20 of this preferred embodiment has already reached the steady state as shown in FIG. 3(*c*).

As described above, the liquid crystal display device 20 of this preferred embodiment has good response characteristic because the unit electrode portion 12*a* has the slits 13. For example, even if the substantially square unit electrode portion 12*a* shown in FIG. 1 has a length of approximately 45 μm or more each side, a liquid crystal display device that would never allow the viewer to perceive any residual image can still be obtained by arranging the slits 13.

For example, when the substantially square unit electrode portion 12*a* shown in FIG. 1 had a length of approximately 60 μm each side, no residual images were sensed at all in the arrangement with eight slits shown in FIG. 1, in which four slits with a width of 4 μm and a length of 7 μm were arranged diagonally (and the distance from the center of the protrusion 23 to the edge of the slits was 22 μm) and four more slits with a width of 4 μm and a length of 5 μm were arranged perpendicularly to the four sides (and the distance from the center of the protrusion 23 to the edge of the slits was 18 μm) As used herein, the "width" of a slit is its length measured circumferentially along a circle that is drawn round the protrusion 23 (i.e., in the tangential direction with respect to the circle), while the "length" of a slit is its length measured radially.

Figure 4:
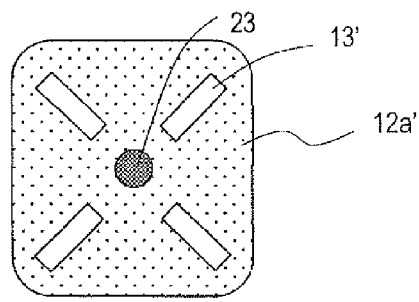
FIGS. 4(a) and 4(b) illustrate other exemplary unit electrode portions for a pixel electrode in a liquid crystal display device as a preferred embodiment of the present invention.
Figure 4:
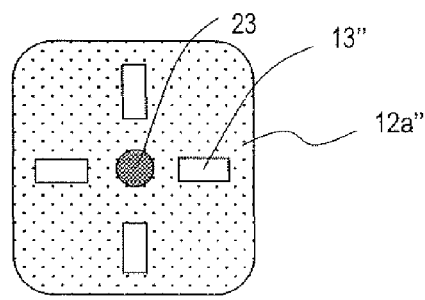

In the example described above, eight slits 13 are supposed to be arranged in each unit electrode portion 12*a*. However, this is just an example. Alternatively, only four slits 13' could be arranged diagonally with respect to the unit electrode portion 12*a* as in the unit electrode portion 12*a*' shown in FIG. 4(*a*) or only four slits 13" could be arranged perpendicularly to the four sides of the unit electrode portion 12*a* as in the unit electrode portion 12*a*" shown in FIG. 4(*b*). In any case, those slits are preferably arranged so as to equally divide the central angle of a circle drawn round the protrusion 23. In the preferred embodiment described above, since the unit electrode portion 12*a* is substantially square, eight slits 13 are arranged every 45 degrees in the examples shown in FIGS. 1(*a*) and 1(b) and four slits 13' or 13" are arranged every 90 degrees in the examples shown in FIGS. 4(a) and 4(b). On the other hand, if the unit electrode portion 12a is rectangular, those slits may also be arranged so as to run diagonally and/or perpendicularly to the four sides, even though the central angle will not be divided equally. In that case, the slits will be arranged so as to have rotational symmetry that would have a two-fold rotation axis at the center of the protrusion.

Also, if each pixel is large, then each unit electrode portion 12a may also have its size increased. In that case, the unit electrode portions 12a may be arranged as a tetragonal lattice as shown in FIG. 1(b). By adopting such a configuration in which the unit electrode portions 12a are arranged as a tetragonal lattice, radially tilting alignment domains will also be produced even in the regions surrounded with the unit electrode portions 12a (i.e., where the conductive film discontinues). And the liquid crystal molecules in those radially tilting alignment domains will be aligned continuously with the liquid crystal molecules in the radially tilting alignment domains to be produced in the unit electrode portions 12a, and therefore, will stabilize the alignment of the radially tilting alignment domains produced in the respective unit electrode portions 12a.

As described above, in the liquid crystal layer 32 of the liquid crystal display device 20 of this preferred embodiment of the present invention, the same liquid crystal domains are produced as in the conventional CPA mode liquid crystal display device. However, at the radially running edges of the slits 13 of the pixel electrode 12, an oblique electric field is also generated so as to incline circumferentially along a circle (i.e., in the tangential direction) drawn round the protrusion 23. Consequently, the liquid crystal molecules 32a in the liquid crystal domains to be produced in the respective unit electrode portions 12a are aligned substantially radially as a whole. But the liquid crystal molecules 32a located around those radially running edges of the slits 13 will tilt circumferentially (i.e., in the tangential direction), thus disturbing the radially tilting alignment locally. Nevertheless, since the liquid crystal molecules 32a in the liquid crystal domains produced in the respective unit electrode portions 12a are aligned in all directions (i.e., all of the directions defined by azimuth angles within a plane of the liquid crystal layer), the liquid crystal display device of this preferred embodiment will achieve no less good viewing angle characteristic than the conventional CPA mode liquid crystal display device. Furthermore, just like the conventional device, a chiral agent could be added to the liquid crystal material, too.

In the foregoing description, a transmission type liquid crystal display device has been described as a preferred embodiment of a liquid crystal display device according to the present invention. Alternatively, if two out of the three unit electrode portions 12a of the pixel electrode 12 shown in FIG. 1(a) are implemented as transparent electrodes (of ITO, for example) and the other unit electrode portion 12a is implemented as a reflective electrode (of Al, for example), then the liquid crystal display device of the present invention could also function as a transflective liquid crystal display device. In that case, to conduct a display operation in reflection mode, a quarter wave plate needs to be arranged at least between the polarizer that is located closer to the viewer and the reflective electrode.

INDUSTRIAL APPLICABILITY

A liquid crystal display device according to the present invention can be used effectively as an LCD monitor of any size for cellphones, PDAs, laptops, desktops, TV receivers and sundry other sorts of electronic devices, no matter how big or small the monitor should be.

The invention claimed is:

1. A liquid crystal display device comprising:
a first substrate, a second substrate and a vertical alignment type liquid crystal layer that is interposed between the first and second substrates,
wherein the device further includes pixel electrodes that are arranged on the first substrate to face the liquid crystal layer and a counter electrode that is arranged on the second substrate to face the liquid crystal layer, and
wherein each of the pixel electrodes has a plurality of unit electrode portions, each of the unit electrode portions comprising a conductive film with slits defined therein,
wherein when a predetermined voltage is applied between the pixel electrode and the counter electrode, a liquid crystal domain is produced in association with each said unit electrode portion and liquid crystal molecules in the liquid crystal domain come to have a substantially radially tilting alignment state,
wherein protrusions of a dielectric material are arranged on one side of the counter electrode to face the liquid crystal layer such that the protrusions face substantially the respective centers of their associated unit electrode portions; and
when viewed perpendicularly to the liquid crystal layer, the shortest distance from the center of each said protrusion to an edge of its associated unit electrode portion is more than 20 μm.

2. The liquid crystal display device of claim 1, wherein the slits are arranged radially around each of said protrusions.

3. The liquid crystal display device of claim 2, wherein each said slit runs longer radially rather than circumferentially if a circle is drawn with each of the protrusions for its center.

4. The liquid crystal display device of claim 1, wherein the number of the slits is at least four.

\* \* \* \* \*